(12) United States Patent
Lu et al.

(10) Patent No.: US 10,730,060 B2
(45) Date of Patent: Aug. 4, 2020

(54) CONVENIENT SWITCHING VALVE

(71) Applicant: XIAMEN EASO CO., LTD., Xiamen, Fujian (CN)

(72) Inventors: Haitao Lu, Xiamen (CN); Zhen Li, Xiamen (CN); Ximin Chen, Xiamen (CN)

(73) Assignee: XIAMEN EASO CO., LTD., Xiamen, Fujian (CN)

( * ) Notice: Subject to any disclaimer, the term of this patent is extended or adjusted under 35 U.S.C. 154(b) by 134 days.

(21) Appl. No.: 16/127,234

(22) Filed: Sep. 11, 2018

(65) Prior Publication Data

US 2020/0078801 A1    Mar. 12, 2020

(51) Int. Cl.
| | |
|---|---|
| *B05B 1/16* | (2006.01) |
| *F16K 31/60* | (2006.01) |
| *F16K 11/044* | (2006.01) |
| *B05B 12/00* | (2018.01) |
| *G05D 7/06* | (2006.01) |
| *F16K 11/14* | (2006.01) |
| *F16K 11/10* | (2006.01) |
| *F16K 11/16* | (2006.01) |

(52) U.S. Cl.
CPC .......... *B05B 1/1672* (2013.01); *B05B 12/002* (2013.01); *F16K 11/0445* (2013.01); *F16K 31/602* (2013.01); *B05B 1/1663* (2013.01); *F16K 11/10* (2013.01); *F16K 11/105* (2013.01); *F16K 11/14* (2013.01); *F16K 11/16* (2013.01); *G05D 7/0664* (2013.01)

(58) Field of Classification Search
CPC ... B05B 1/1672; B05B 12/002; B05B 1/1663; F16K 31/602; F16K 11/0445; F16K 11/105; F16K 11/14; F16K 11/10; F16K 11/16; G05D 7/0664
See application file for complete search history.

(56) References Cited

U.S. PATENT DOCUMENTS

| | | | | |
|---|---|---|---|---|
| 2,231,460 A | * | 2/1941 | Barman ..................... | C02F 1/42 137/597 |
| 2,548,933 A | * | 4/1951 | Barnett ................. | F16K 31/602 137/637 |
| 2,575,940 A | * | 11/1951 | Brown, Jr. ............ | F16K 11/202 137/584 |
| 2,747,603 A | * | 5/1956 | Klingler .................. | F16K 11/16 137/343 |
| 2,759,459 A | * | 8/1956 | Lucien .................... | F01L 25/08 137/596.17 |

(Continued)

*Primary Examiner* — Matthew W Jellett
*Assistant Examiner* — Christopher D Ballman
(74) *Attorney, Agent, or Firm* — Chun-Ming Shih

(57) ABSTRACT

A convenient switching valve includes a main body, a switching member and a positioning disc. The main body is provided with a water inlet and at least one water outlet. The positioning disc is rotatably fitted at an end of the main body. The positioning disc cooperates with the switching member, enabling the switching member to be moved in the main body to block a water passage between the water inlet and the water outlet. By rotating the positioning disc, the positioning disc movably press the switching member to block the water passage, thereby realizing the control of the water flow of the water outlet. The operation is convenient and labor-saving.

7 Claims, 9 Drawing Sheets

(56) References Cited

U.S. PATENT DOCUMENTS

| | | | | |
|---|---|---|---|---|
| 2,934,091 A | * | 4/1960 | Chapou | F16K 31/52416 137/628 |
| 3,099,461 A | * | 7/1963 | Stelzer | B60G 17/0525 280/124.157 |
| 3,557,828 A | * | 1/1971 | Smith | E21D 23/26 137/596.1 |
| 4,220,175 A | * | 9/1980 | Keller, III | F16K 11/165 137/454.6 |
| 4,288,036 A | * | 9/1981 | Jubinville | B05B 7/1209 239/345 |
| 4,375,223 A | * | 3/1983 | Baillie | F15B 13/042 137/116.5 |
| 4,957,137 A | * | 9/1990 | Wang | F16K 31/52416 137/454.6 |
| 4,964,433 A | * | 10/1990 | Marietta | F16K 11/0743 137/115.04 |
| 5,052,438 A | * | 10/1991 | Wang | F16K 11/165 137/607 |
| 5,185,893 A | * | 2/1993 | Lin | E03C 1/023 137/597 |
| 5,375,819 A | * | 12/1994 | Galazin | B60G 17/0525 267/64.16 |
| 5,398,725 A | * | 3/1995 | Nakazawa | F16K 11/165 137/636.1 |
| 5,787,932 A | * | 8/1998 | Pierce | B60G 17/0525 137/627.5 |
| 5,934,320 A | * | 8/1999 | O'Reilly | F16K 3/04 137/270 |
| 6,202,992 B1 | * | 3/2001 | O'Reilly | B60G 17/0525 267/64.18 |
| 6,217,010 B1 | * | 4/2001 | McNeely | F16F 9/081 267/64.16 |
| 6,405,758 B1 | * | 6/2002 | Hara | F16K 11/165 137/630.2 |
| 6,945,275 B2 | * | 9/2005 | Krechmery | B60R 21/239 137/625.21 |
| 8,881,620 B2 | * | 11/2014 | Togashi | G05G 5/06 74/497 |
| 9,027,853 B2 | * | 5/2015 | Langkamp | F16K 31/52416 239/394 |
| 9,975,392 B2 | * | 5/2018 | Ahmadian | B60G 11/27 |
| 10,040,331 B2 | * | 8/2018 | Gandhi | B60G 17/0155 |
| 10,443,219 B2 | * | 10/2019 | Yuan | B05B 1/046 |
| 2012/0222695 A1 | | 9/2012 | Suter | A01K 13/001 132/200 |
| 2015/0017327 A1 | * | 1/2015 | Myers | B05B 7/1209 427/207.1 |
| 2017/0090488 A1 | * | 3/2017 | Chen | G05D 7/0664 |
| 2019/0070621 A1 | * | 3/2019 | Salmons | B05B 7/32 |
| 2019/0106865 A1 | * | 4/2019 | Dolgos | G05D 23/134 |
| 2019/0224694 A1 | * | 7/2019 | Wang | B05B 1/18 |
| 2019/0283049 A1 | * | 9/2019 | Lin | B05B 1/18 |

* cited by examiner

CONVENIENT SWITCHING VALVE

BACKGROUND OF THE INVENTION

1. Field of the Invention

The present invention relates to a shower device, and more particularly to a convenient switching valve.

2. Description of the Prior Art

In general, the water passages of a shower head and a hand-held shower of a shower device are diverted through a three-way water distributor. The direction of the water flow can be changed by adjusting a switching valve in the three-way water distributor, so that shower head or the hand-held shower can spray water to meet different bathing needs.

A conventional three-way water distributor controls the switching valve by rotating a knob to switch the water passages. The unified knob design lacks novelty and cannot meet the needs of some users. In order to facilitate the rotation of the knob, the knob is provided with a handle that can be rotated at a large angle. The structural design of the external handle increases the size of the water distributor. Due to the moisture in the bathroom and repeated swing of the handle, the risk of damage to the external handle is very high. The service life of the handle is affected greatly. Once damaged, it is necessary to replace the knob and handle, or the entire water distributor. There is no switching valve that has a simple structure and takes less space on the market.

Accordingly, the inventor of the present invention has devoted himself based on his many years of practical experiences to solve these problems.

SUMMARY OF THE INVENTION

The primary object of the present invention is to provide a convenient switching valve, which is capable of controlling the water of the outlet pipe and has the characteristics of labor-saving operation, long service life and taking less space.

In order to achieve the above object, the present invention adopts the following technical solutions.

A convenient switching valve comprises a main body, a switching member and a positioning disc. The main body is provided with a switching chamber. The switching chamber includes a first switching chamber. An inner wall of the switching chamber is formed with a water inlet. The first switching chamber is formed with a first water outlet. The switching member includes a first switching lever. The first switching lever is movably disposed in the first switching chamber. The first switching lever is provided with a first water-stop part. The first water-stop part is sealingly fitted against an inner wall of the first switching chamber. The positioning disc is rotatably fitted at an end of the switching chamber. A bottom surface of the positioning disc is provided with a boss for an end of the first switching lever to be movably fitted. The first water-stop part is movable to block a water passage between the water inlet and the first water outlet.

Preferably, a distance between the boss and the bottom surface of the positioning disc in an axial direction of the first switching chamber is not less than a distance between the first water outlet and the water inlet. A distance between the first water-stop part and an end of the first switching lever facing an opening of the switching chamber is not greater than a distance between the water inlet and the boss in the axial direction of the first switching chamber.

Preferably, a slope is provided between the boss and the bottom surface of the positioning disc.

Preferably, a spring is provided between the first switching lever and the first switching chamber, and the spring provides an elastic force to press the first switching lever toward the positioning disc.

Preferably, an annular groove is formed on the first water-stop part, and the annular groove is provided with a first sealing ring.

Preferably, a chamfer is formed on a side wall of the first switching chamber facing the water inlet. The first switching chamber is gradually reduced from the opening to a bottom wall of the first switching chamber.

Preferably, the switching member includes a second switching lever. A bottom wall of the switching chamber is convexly formed with a partition portion in the direction of the opening. The partition portion divides the switching chamber into the first switching chamber and a second switching chamber. The positioning disc is sealingly fitted at an end of the partition portion. The water inlet communicates with the first switching chamber and the second switching chamber, respectively. The second switching lever has a structure same as that of the first switching lever. The second switching chamber has a structure same as that of the first switching chamber.

Preferably, the bottom surface of the positioning disc is provided with a single discharge limiting hole. The boss and the single discharge limiting hole are arranged symmetrically relative to a center of the positioning disc.

Preferably, the slope is provided with two mixed discharge limiting holes that are respectively disposed at two sides of a straight line where the boss and the single discharge limiting hole are located. The boss, the mixed discharge limiting holes and the single discharge limiting hole are disposed at an angle of 90° to each other.

Preferably, the positioning disc is provided with positioning grooves corresponding in position to the boss, the single discharge limiting hole and the mixed discharge limiting hole, respectively. The main body is provided with a positioning member that is movably engaged in one of the positioning grooves.

By rotating the positioning disc, the positioning disc movably press the first switching lever, and the first water-stop part is moved to block the water passage, thereby realizing the control of the water of the first outlet pipe. The operation is convenient and labor-saving. Only the first water-stop part may be worn during use. The maintenance cost is low and the service life is longer. The structure of the present invention is compact and takes up less space.

DETAILED DESCRIPTION OF THE
PREFERRED EMBODIMENTS

Embodiments of the present invention will now be described, by way of example only, with reference to the accompanying drawings.

Spatially relative terms, such as "upper," "lower," "left," "right," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures.

Figure 1:
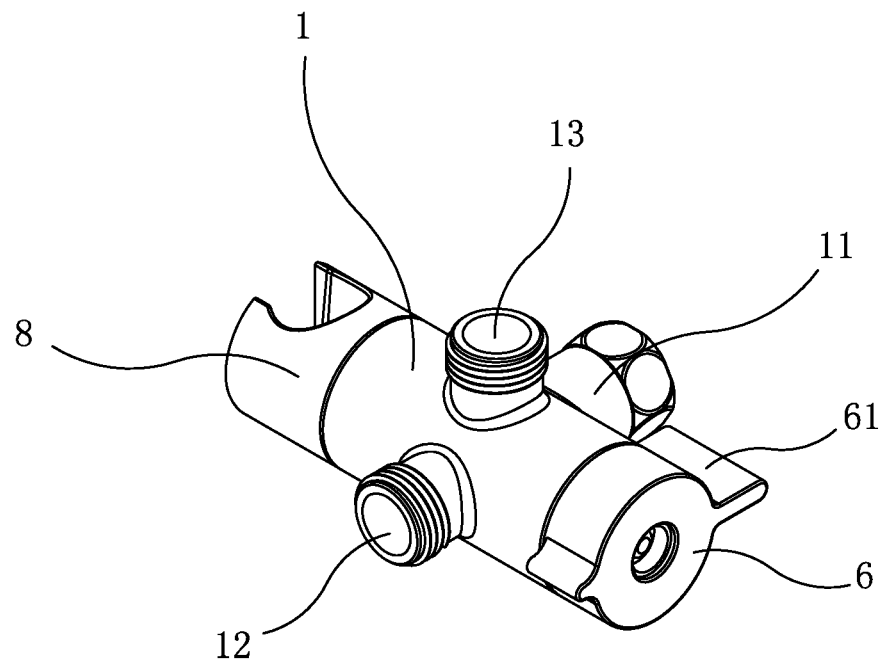
FIG. 1 is a perspective view of the present invention.
Figure 2:
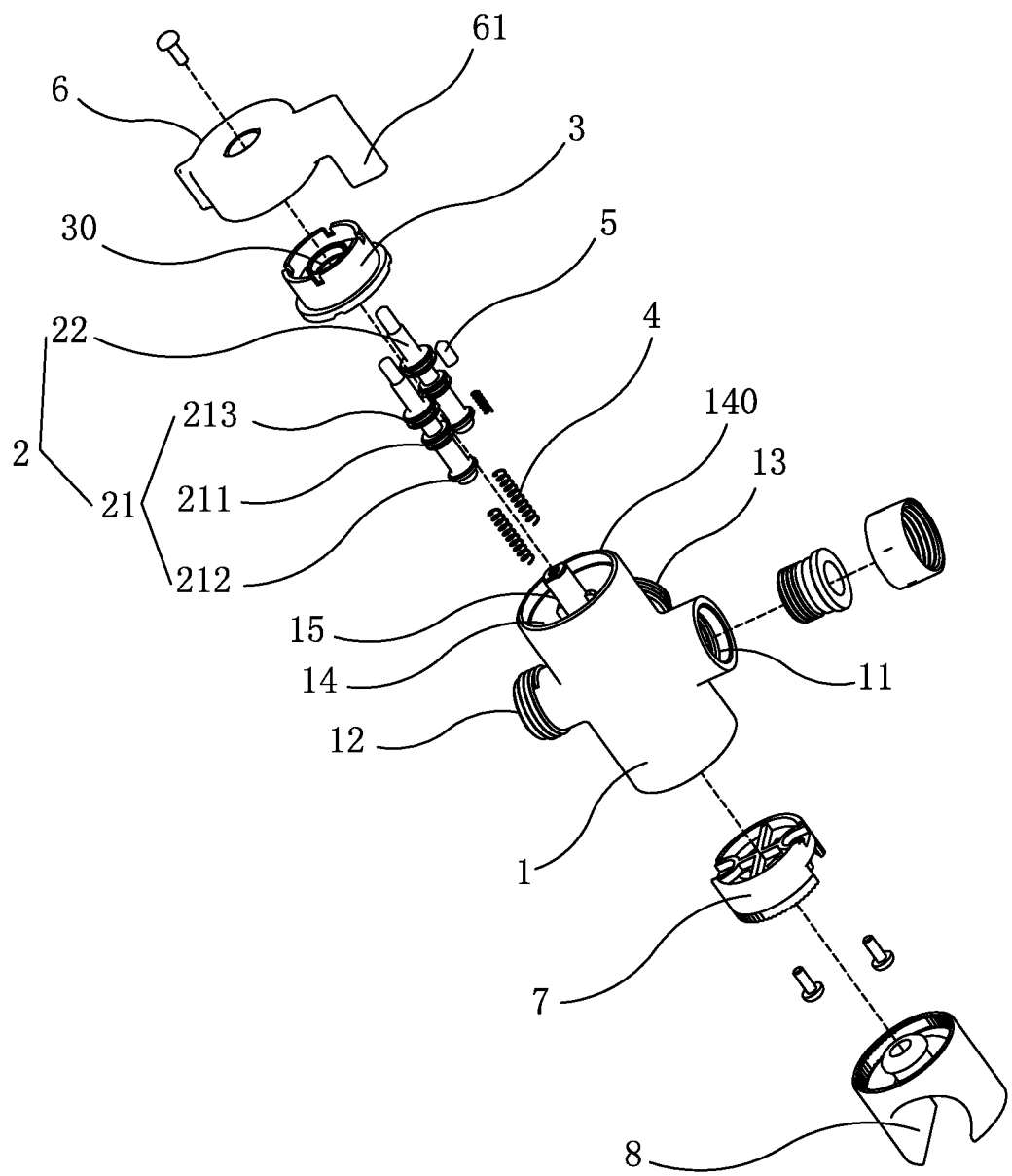
FIG. 2 is an exploded view of the present invention.

As shown in FIG. 1 and FIG. 2, a convenient switching valve comprises a main body 1, a switching member 2, and a positioning disc 3. The switching member 2 is movably disposed in the main body 1 and is movably engaged with the positioning disc 3. The positioning disc 3 is rotatably sealingly connected to the end of the main body 1.

Figure 3:
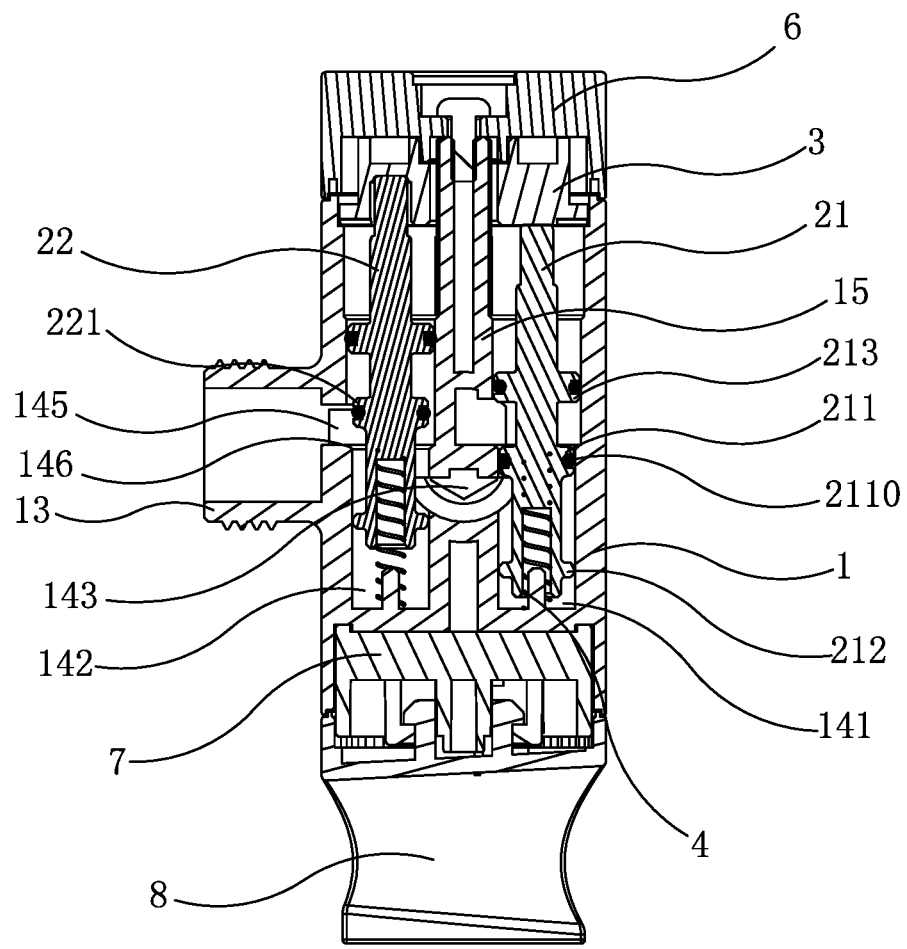
FIG. 3 is a first cross-sectional view of the present invention.
Figure 4:
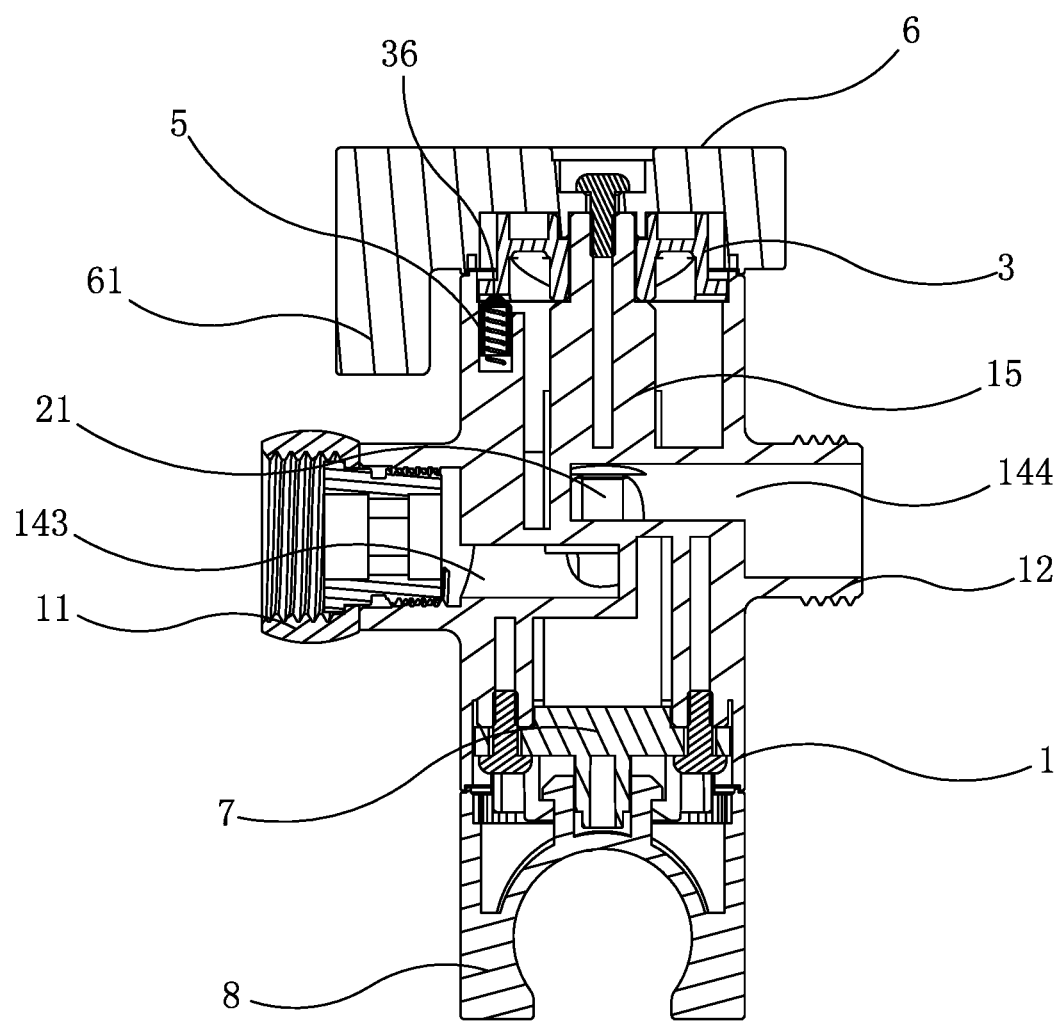
FIG. 4 is a second cross-sectional view of the present invention.
Figure 5:
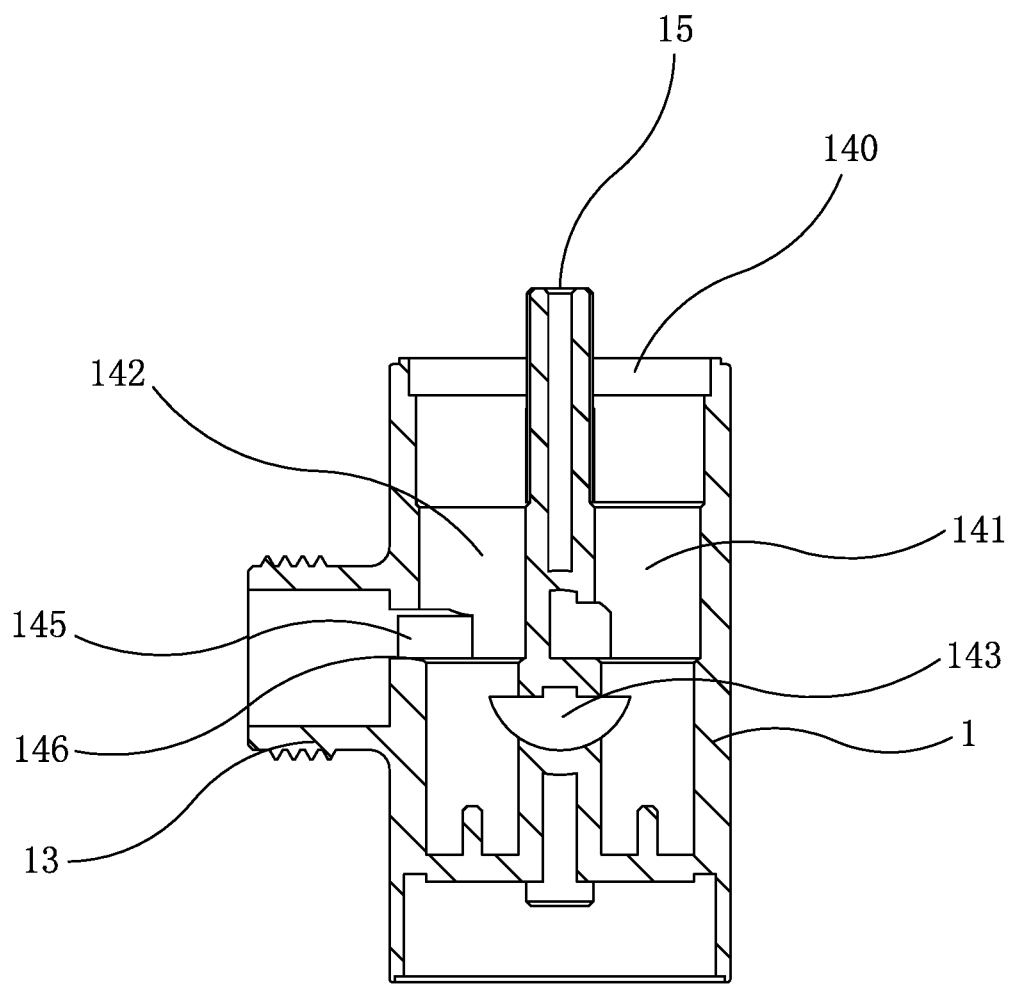
FIG. 5 is a cross-sectional view of the main body of the present invention.
Figure 6:
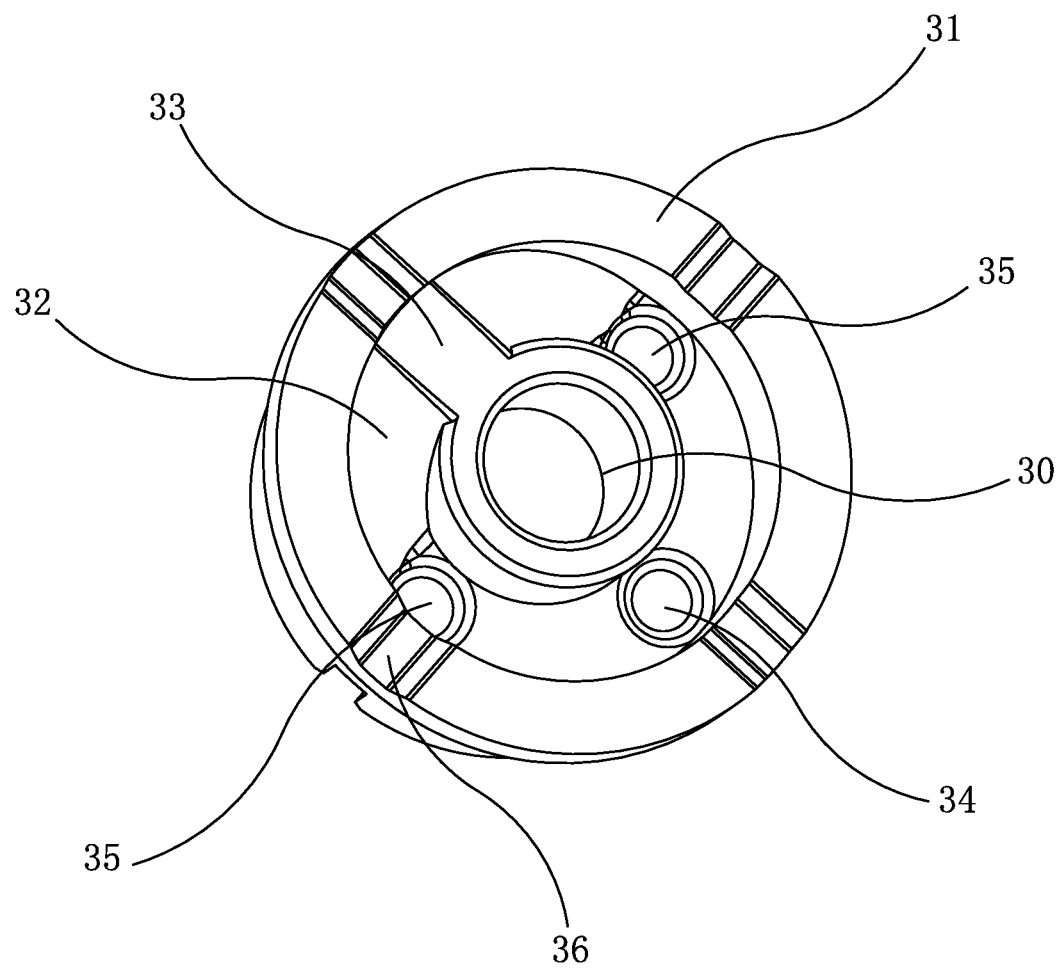
FIG. 6 is a perspective view of the positioning disc of the present invention.
Figure 7:
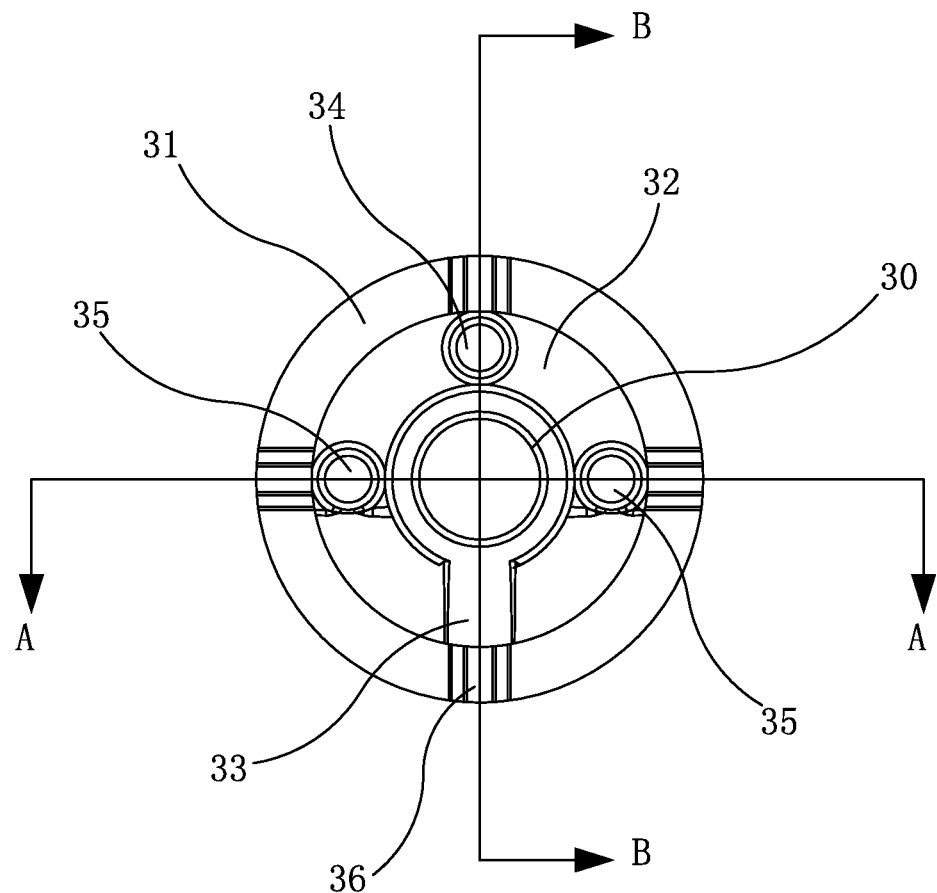
FIG. 7 is a top view of the positioning disc of the present invention.
Figure 8:
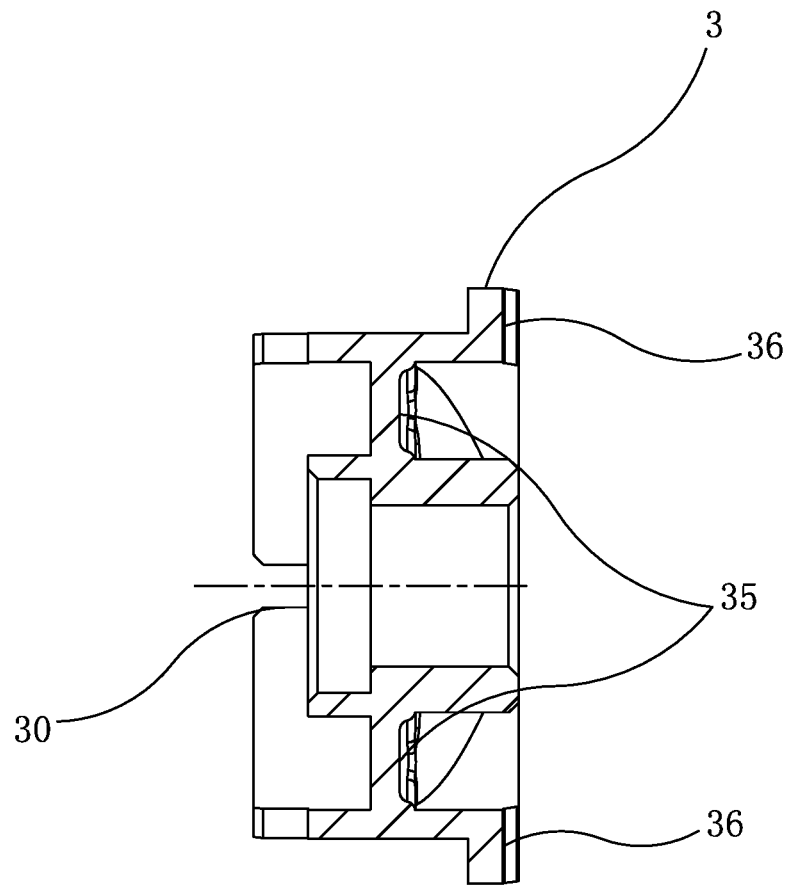
FIG. 8 is a cross-sectional view taken along line A-A of FIG. 6.
Figure 9:
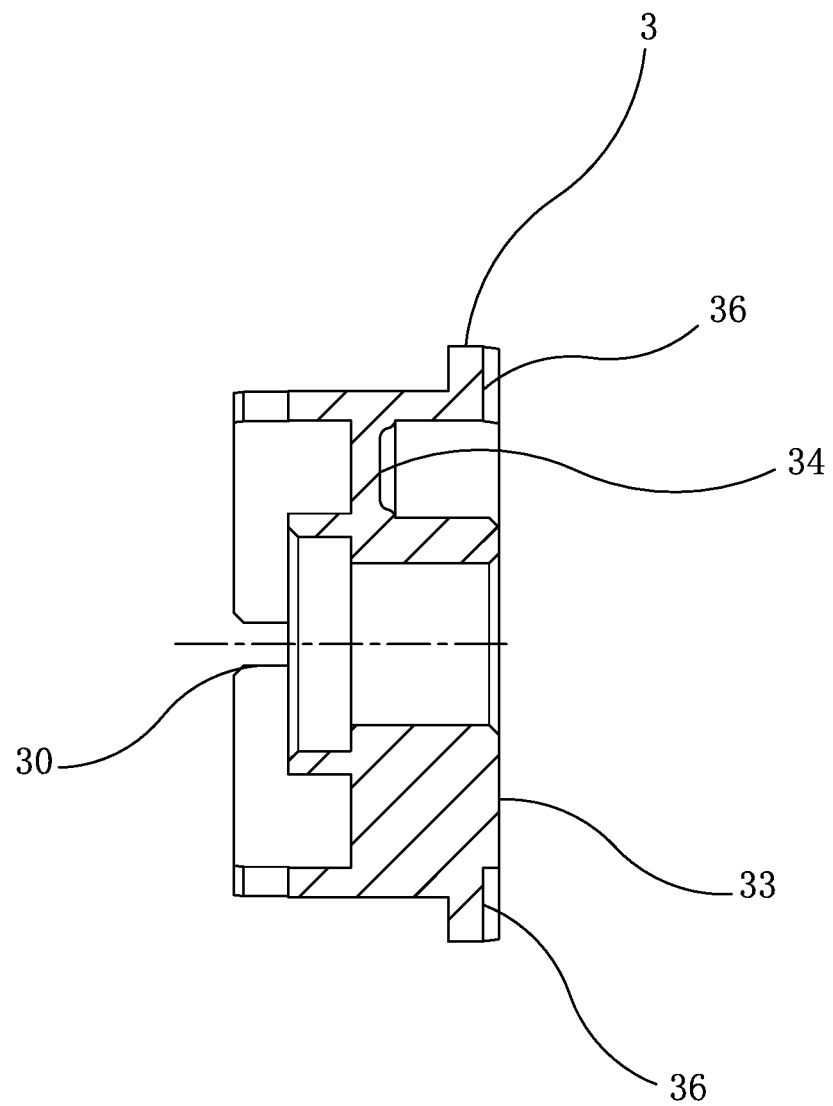
FIG. 9 is a cross-sectional view taken along line B-B of FIG. 6.

The outer wall of the main body 1 is provided with an inlet pipe 11, a first outlet pipe 12, a second outlet pipe 13. The main body 1 has a switching chamber 14 therein for mounting the switching member 2. The switching chamber 14 is formed with an opening 140 for mounting the positioning disc 3. As shown in FIG. 3 to FIG. 5, the bottom wall of the switching chamber 14 is convexly formed with a partition portion 15 in the direction of the opening 140. The switching chamber 14 is partitioned into a first switching chamber 141 and a second switching chamber 142. The inner wall of the switching chamber 14 is formed with a water inlet 143, a first water outlet 144, and a second water outlet 145. The inlet pipe 11 communicates with the first switching chamber 141 and the second switching chamber 142 through the water inlet 143. The first outlet pipe 12 communicates with the first switching chamber 141 through the first water outlet 144. The second outlet pipe 13 communicates with the second switching chamber 142 through the second water outlet 145. The water inlet 143 is not coplanar with the first water outlet 144 and the second water outlet 145 in the axial direction of the switching chamber 14.

The switching member 2 includes a first switching lever 21 and a second switching lever 22. The first switching lever 21 is movably disposed in the first switching chamber 141. The second switching lever 22 is movably disposed in the second switching chamber 142. The structure and working principle of the first switching lever 21 and the second switching lever 22 are the same. The first switching lever 21 is taken as an example for explanation.

The first switching lever 21 is provided with a first water-stop part 211. The first water-stop part 211 is sealingly fitted against the inner wall of the first switching chamber 141. The first water-stop part 211 is movably fitted between one side of the water inlet 143 facing the first water outlet 144 and one side of the first water outlet 144 facing away from the water inlet 143. When the first water-stop part 211 is located between the water inlet 143 and the first water outlet 144, the first switching chamber 141 at both sides of the first water-stop part 211 does not communicate with each, and the water flows sequentially through the water inlet pipe 11, the water inlet 143 and the first switching chamber 141, but the water cannot flow to the first water outlet 144. When the first water-stop part 211 is located at the side of the first water outlet 144 facing away from the water inlet 143, the water flows sequentially through the water inlet pipe 11, the water inlet 143, the first switching chamber 141 and the first water outlet 144, and flows out of the water outlet pipe 12.

The first water-stop part 211 may be made of an elastic material, and its size is slightly greater than the size of the first switching chamber 141 to achieve a tight fitting effect. The first water-stop part 211 may be made of a hard material. An annular groove is formed on the first water-stop part 211. The annular groove is provided with a first sealing ring 2110.

A chamfer 146 may be formed on a side wall of the first switching chamber 141 facing the water inlet 143 to provide a seating and guiding space for the movement of the first water-stop part 211 and avoid wear of the first water-stop part 211 or the sealing ring 2110 by the sharp corner structure, thereby prolonging the service life of the present invention. The first switching chamber 141 is gradually reduced from the opening 140 to the bottom wall to facilitate the formation of the chamfer 146 by the mold. The second water outlet 145 has the same structure as the first water outlet 144.

The first switching lever 21 further includes a first directional edge 212. The first directional edge 212 is movably disposed in the first switching chamber 141, and its size is slightly less than that of the first switching chamber 141. It is convenient for the first switching lever 21 to move in the first switching chamber 141 and cooperate with the first water-stop part 211 to ensure that the first switching lever 21 does not deflect when moving in the axial direction of the first switching chamber 141, thereby avoiding the effect of blocking the water.

In addition, the first switching lever 21 further includes a first water-sealing part 213 that is tightly fitted in the first switching chamber 141, thereby enhancing the sealing property of the first switching chamber 141, so that the water does not flow out of the opening 140 from the first switching chamber 141. The first water-sealing part 213 is similar to the first water-stop part 211. The first water-sealing part 213 may be made of an elastic material to achieve a tight fitting effect, or may be made of a hard material. The first water-sealing part 213 is provided with a sealing ring thereon. For the first switching chamber 141 that is gradually reduced from the opening 140 to the bottom wall, the first water-sealing part 213 is greater than the first water-stop part 211 in size. The first water-sealing part 213 is fixed on the first switching lever 21 at the side of the first water-stop part 211 facing the opening 140.

The positioning disc 3 is rotatably fitted at the end of the partition portion 15 and is in sealing engagement with the opening 140. As shown in FIG. 6 to FIG. 9, the positioning disc 3 is provided with a through hole 30. By screwing a bolt through the through hole 30 into the end of the partition portion 15, the positioning disc 3 is rotatably connected to the end of the partition portion 15. The positioning disc 3 can be rotated about the bolt. A seal ring may be fitted between the outer circumference of the positioning disc 3 and the inner wall of the opening 140 as well as between the through hole 30 and the end of the partition portion 15 to enhance the sealing property of the present invention.

The positioning disc 3 includes a side wall 31 and a slope 32 disposed in the side wall 31. The bottom end of the slope 32, facing the bottom wall of the switching chamber 14, is provided with a boss 33. The top end of the slope 32, facing away from the bottom wall of the switching chamber 14, is provided with a single discharge limiting hole 34. The boss 33 and the single discharge limiting hole 34 are oppositely disposed. The end of the first switching lever 21 is movably fitted on the slope 32, such that the rotation of the positioning disc 3 can bring the axial movement of the first switching lever 21 relative to the first switching chamber 141. The distance between the boss 33 and the bottom wall of the single discharge limiting hole 34 in the axial direction of the first switching chamber 141 is not less than the distance between the first water outlet 144 and the water inlet 143. The distance between the first water-stop part 211 and the end of the first switching lever 21 facing the opening 140 is not greater than the distance between the water inlet 143 and the boss 33 in the axial direction of the first switching chamber 141. With the above structure, the rotation of the positioning disc 3 can realize the following switching states. When the end of the first switching lever 21 is fitted on the boss 33, the first water-stop part 211 is located between the first water outlet 144 and the water inlet 143, and the first switching chamber 141 at both sides of the first water-stop part 211 does not communicate with each other, and the water sequentially flows through the water inlet pipe 11, the water inlet 143 and the first switching chamber 141, and cannot flow to the first water outlet 144. When the end of the first switching lever 21 is fitted in the single discharge limiting hole 34, the first water-stop part 211 is located at the side of the first water outlet 144 facing away from the water inlet 143, the water sequentially flows through the water inlet pipe 11, the water inlet 143, the first switching chamber 141 and the first water outlet 144, and flows out of the first outlet pipe 12. A spring 4 is provided between the first switching lever 21 and the bottom wall of the first switching chamber 141. The spring 4 provides an elastic force to press the first switching lever 21 toward the positioning disc 3.

The structure and the cooperative relationship of the second switching lever 22 and the second switching chamber 142 are the same as those of the first switching lever 21 and the first switching chamber 141. The second switching lever 22 is provided with a second water-stop part 221. When the end of the first switching lever 21 is fitted on the boss 33, the hydraulic pressure and the elastic force of the spring 4 cause the end of the second switching lever 22 to fit in the single discharge limiting hole 34, the first water-stop part 211 is located between the first water outlet 144 and the water inlet 143, the first switching chamber 141 at both sides of the first water-stop part 211 does not communicate with each other, the second water-stop part 221 is located at the side of the second water outlet 145 facing away from the water inlet 143, and the water sequentially flows through the inlet pipe 11, the water inlet 143, the second switching chamber 142 and the second water outlet 145 and then flows out of the second outlet pipe 13 to realize a single water discharge state in which only the second outlet pipe 13 is discharged. On the contrary, when the end of the second switching lever 22 is fitted on the boss 33, the hydraulic pressure and the elastic force of the spring 4 cause the end of the first switching lever 21 to be in the single discharge limiting hole 34, the second water-stop part 221 is located between the second water outlet 145 and the water inlet 143, the second switching chamber 142 at both sides of the second water-stop part 221 does not communicate with each other, the first water-stop part 211 is located at the side of the first water outlet 144 facing away from the water inlet 143, and the water flow sequentially through the inlet pipe 11, the water inlet 143, the first switching chamber 141 and the first water outlet 144 and then flows out of the first outlet pipe 12 to realize a single discharge state in which only the first outlet pipe 12 is discharged.

The slope 32 may be provided with mixed discharge limiting holes 35. The mixed discharge limiting holes 35 are disposed on the slope 32 and located between the boss 33 and the single discharge limiting hole 34. When the ends of the first switching lever 21 and the second switching lever 22 are in the mixed discharge limiting holes 35, both the first outlet pipe 12 and the second outlet pipe 13 discharge water, thereby achieving a state in which the water is mixed. This embodiment has two mixed discharge limiting holes 35 respectively disposed at both sides of the boss 33. The boss 33, the two mixed discharge limiting holes 35 and the single discharge limiting hole 34 are disposed at an angle of 90° with each other, so that the positioning disc 3 can switch a water discharge state every time when it is rotated by 90°.

The boss 33, the single discharge limiting hole 34 and the mixed discharge limiting holes 35 on the side wall 31 are provided with positioning grooves 36, respectively. The inner wall of the opening 140 is provided with a positioning member 5. The positioning member 5 is movably fitted in the positioning groove 36 through a spring. When the user rotates the positioning disc 3, the positioning member 5 can be engaged in one of the positioning grooves 36 to generate a certain resistance reminder and locate the current discharge state.

A knob 6 is connected to the positioning disc 3. The knob 6 is formed with a handle 61 for the user to press the knob 6. The knob 6 may be integrated with the positioning disc 3, that is, the positioning disc 3 is fitted at the opening 140, and the outer wall of the positioning disc 3 is formed with the handle 61.

The main body 1 is further connected with a positioning cover 7. The positioning cover 7 is fixed to the main body 1 through a screw. A bracket 8 for displacement of a shower head is fixed on the positioning cover 7 through a fastener.

By rotating the positioning disc 3, the positioning disc 3 movably press the first switching lever 21 and the second switching lever 22, and the first water-stop part 211 and the second water-stop part 221 are moved to block the water passage, thereby realizing the control of the water of the first outlet pipe 12 and the second outlet pipe 13. The operation is convenient and labor-saving. Only the first water-stop part 211, the second water-stop part 221 and the first sealing ring 2110 may be worn during use. The maintenance cost is low and the service life is longer. The structure of the present invention is compact and takes up less space.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A convenient switching valve, comprising a main body, a switching member and a positioning disc; the main body being provided with a switching chamber, the switching chamber including a first switching chamber; an inner wall of the switching chamber being formed with a water inlet, the first switching chamber being formed with a first water outlet; the switching member including a first switching lever, the first switching lever being movably disposed in the first switching chamber; the first switching lever being provided with a first water-stop part, the first water-stop part being sealingly fitted against an inner wall of the first switching chamber; the positioning disc being rotatably fitted at an end of the switching chamber, a bottom surface of the positioning disc being provided with a boss for an end of the first switching lever to be movably fitted, the first water-stop part being movable to block a water passage between the water inlet and the first water outlet;

wherein the switching member includes a second switching lever; a bottom wall of the switching chamber is convexly formed with a partition portion in the direction of the opening, the partition portion divides the switching chamber into the first switching chamber and a second switching chamber, the positioning disc is sealingly fitted at an end of the partition portion; the water inlet communicates with the first switching chamber and the second switching chamber respectively; the second switching lever has a structure same as that of the first switching lever, and the second switching chamber has a structure same as that of the first switching chamber;

wherein the bottom surface of the positioning disc is provided with a single discharge limiting hole, the boss and the single discharge limiting hole are arranged symmetrically relative to a center of the positioning disc;

wherein the slope is provided with two mixed discharge limiting holes that are respectively disposed at two sides of a straight line where the boss and the single discharge limiting hole are located; the boss, the mixed discharge limiting holes and the single discharge limiting hole are disposed at an angle of 90° to each other.

2. The convenient switching valve as claimed in claim 1, wherein a distance between the boss and the bottom surface of the positioning disc in an axial direction of the first switching chamber is not less than a distance between the first water outlet and the water inlet, a distance between the first water-stop part and an end of the first switching lever facing an opening of the switching chamber is not greater than a distance between the water inlet and the boss in the axial direction of the first switching chamber.

3. The convenient switching valve as claimed in claim 2, wherein a slope is provided between the boss and the bottom surface of the positioning disc.

4. The convenient switching valve as claimed in claim 1, wherein a spring is provided between the first switching lever and the first switching chamber, and the spring provides an elastic force to press the first switching lever toward the positioning disc.

5. The convenient switching valve as claimed in claim 1, wherein an annular groove is formed on the first water-stop part, and the annular groove is provided with a first sealing ring.

6. The convenient switching valve as claimed in claim 5, wherein a chamfer is formed on a side wall of the first switching chamber facing the water inlet; and the first switching chamber is gradually reduced from an opening to a bottom wall of the first switching chamber.

7. The convenient switching valve as claimed in claim 1, wherein the positioning disc is provided with positioning grooves corresponding in position to the boss, the single discharge limiting hole and the mixed discharge limiting hole respectively, and the main body is provided with a positioning member that is movably engaged in one of the positioning grooves.

* * * * *